Oct. 12, 1937.  L. R. RHEIN  2,095,715
GLARE SHIELD
Filed July 22, 1936  2 Sheets-Sheet 1
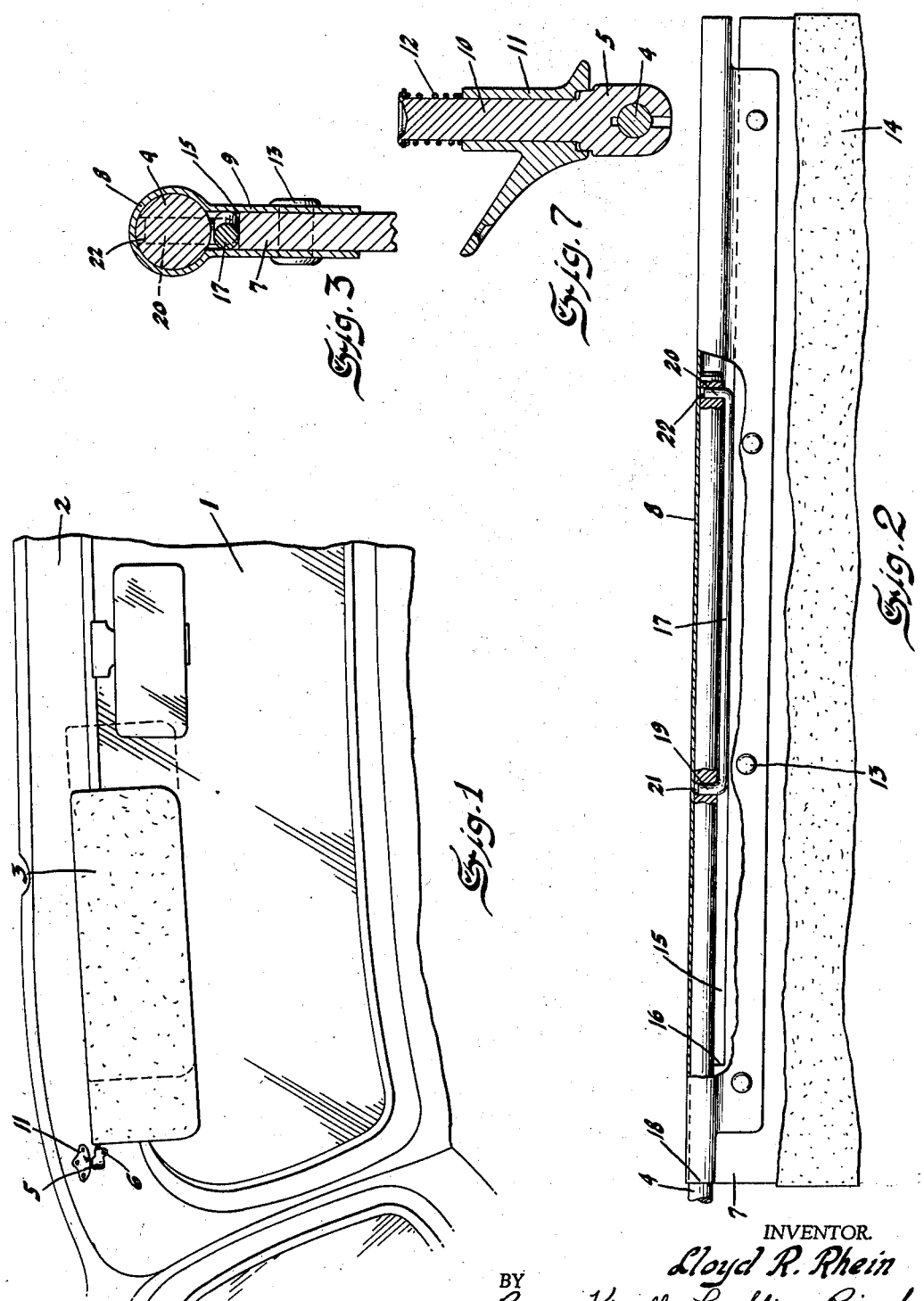
INVENTOR.
Lloyd R. Rhein
BY
Barney, Kisselle, Laughlin & Raisch
ATTORNEYS.

Oct. 12, 1937.  L. R. RHEIN  2,095,715
GLARE SHIELD
Filed July 22, 1936 2 Sheets-Sheet 2
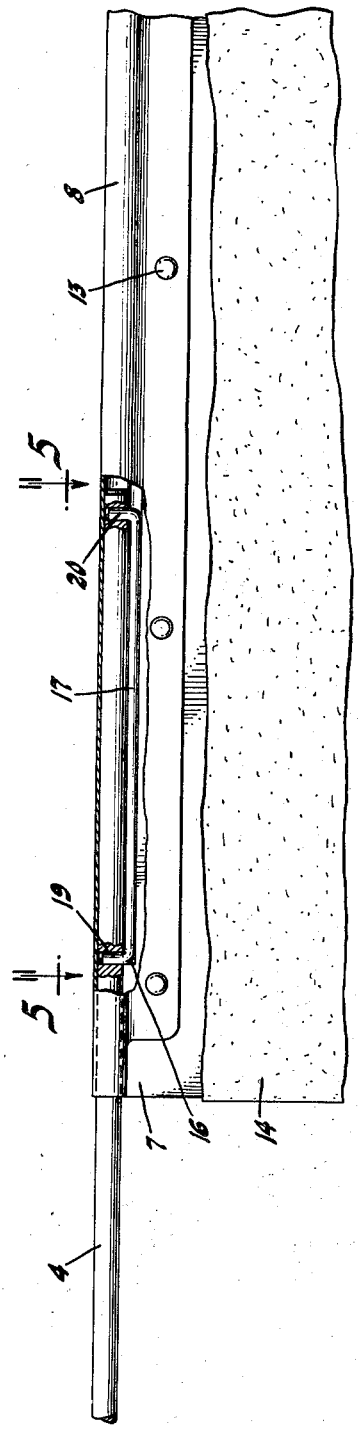
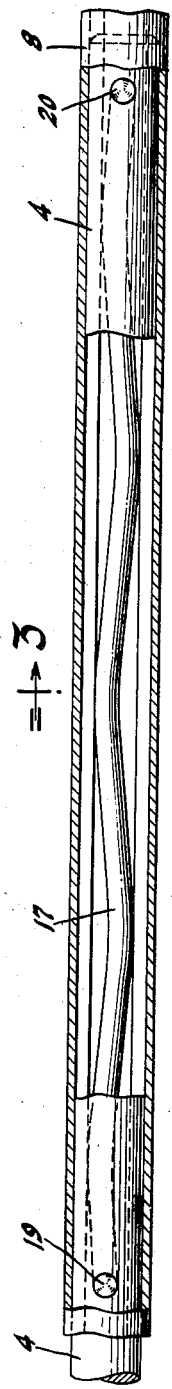
INVENTOR.
Lloyd R. Rhein
BY
Barnes, Kisselle, Laughlin & Raisch
ATTORNEYS.

Patented Oct. 12, 1937

2,095,715

UNITED STATES PATENT OFFICE 2,095,715

GLARE SHIELD

Lloyd R. Rhein, Pleasant Ridge, Mich., assignor to Ternstedt Manufacturing Company, Detroit, Mich., a corporation of Michigan Application July 22, 1936, Serial No. 91,854

9 Claims. (Cl. 296—97)

This invention relates to a glareshield.

This invention is concerned with a glareshield which is carried by a support rod, one end of which has a swivel hinge attachment with the roof of the vehicle body and the other end of which is free, and in particular with a novel arrangement for adjusting the glareshield axially along this support rod.

In the drawings:

Fig. 1 is a fragmentary view of the inside of a vehicle showing the glareshield mounted therein.

Fig. 2 is a detail of the glareshield with the trimming and a portion of the tubular support broken away showing the glareshield in one position of adjustment.

Fig. 3 is a section along the line 3—3 of Fig. 5.

Fig. 4 is a view similar to Fig. 2 showing the glareshield in another position of adjustment on its support rod.

Fig. 5 is a view along the line 5—5 of Fig. 4 with a portion of the tubular support broken away.

Fig. 6 is a detail of the spring wire retainer for holding the glareshield in its adjusted position on the rod.

Fig. 7 is a detail of the swivel bracket support for the glareshield support rod.

Referring more particularly to the drawings there is shown an automotive vehicle having a windshield 1 and a windshield header 2. The glareshield assembly comprises briefly a glareshield 3, a tubular support for the shield 3 and a support rod 4 telescoped in tube 8 and mounted on the header 2 so that the shield can be swung from a position in front of the driver and behind the windshield to a position alongside the driver and within the front door window glass. One end of the rod 4 is journaled in the split bracket 5. The stem 10 of the bracket is swiveled in the plate 11 which is secured to the header 2. The stem 10 and plate 11 respectively have a cooperating tapered shoulder and socket which frictionally engage each other and a coil spring 12 is mounted over the stem 10 between the end of the same and the plate 11 to increase the friction between the stem 10 and plate 11. This friction holds the glareshield support arm 4 in any position to which it is swung, but can be manually overcome. A take-up screw 6 is provided for increasing the friction between the end of the rod 4 and the bracket 5 so that the glareshield 3, which rotates with the rod 4, will be held in any position to which it is swung up or down.

The glareshield comprises an insert of stiff fiber board 7 carried by tubular support 8. The support 8 comprises a sheet metal strip folded intermediate its edges to provide lips 9 which overlap and are secured to the board 7 by the rivets 13. The board 7 and the support 8 are completely covered with trim material 14. The rod 4 is inserted in the tubular support 8 so that the support 8 and glareshield 3 are slidably adjustable therealong.

Since it is desired to key the glareshield 3 to the shaft 4 so that the glareshield cannot rotate about the shaft 4, to this end the fiber board 7 is provided with a notch 15 terminating in a shoulder 16. The shoulder 16 is positioned between the end of the rod which is supported in the bracket 5 and the key 17. The key 17 and slot 15 permit the glareshield to be shifted along the rod 4 away from the bracket 5 until the shoulder 16 abuts the key 17. The glareshield, of course, can be shifted along the rod 4 and toward the bracket 5 until the inner end 18 of the tubular support 8 abuts the bracket 5.

Since it is desirable to hold the glareshield in any of its adjusted positions, to this end the key 17 takes the form of an undulated spring wire, the outer ends of which are turned upwardly as at 19 and 20 and inserted in holes 21 and 22 in the rod 4. The spring 17 is positioned within the notch 15 and crowded between the sides 9 of the tubular support 8 so that the spring 17 is compressed and therefore frictionally engages the sides 9 of the support 8. The interengagement of the ends of the spring 17 in the holes 21 and 22, which extend transversely of the rod 4, causes the spring 17 to act as a key which cooperates with the sides 9 of the tubular support 8 to key the glareshield to the rod 4 and prevent rotation of the glareshield 7 about the rod 4.

The spring 17, which is described above, serves three very useful functions, namely, it acts as a retainer for holding the glareshield in any position of adjustment along the rod 4; it acts as a key to retain the glareshield support 8 in telescopic relation with the rod 4 and prevent the glareshield from being slid off the end of the rod; and lastly, it serves as a key to prevent relative rotation between the rod 4 and the glareshield.

I claim:

1. In a glareshield for an automotive vehicle body, a rod having one end adapted to be secured to the automotive vehicle body, a shield carried by, and adjustable along, the said rod, resilient means fixed to the rod for frictionally engaging the shield to resist movement of the shield along the rod, and a stop carried by the said shield adapted to move along the said rod between the said resilient means and the end of the rod adapted for support to the vehicle body, the said stop cooperating with the resilient means to limit adjustment of the said shield along the said rod and prevent disengagement of the shield from the rod.

2. A glareshield for an automotive vehicle body comprising a round rod having one end adapted for securement to the vehicle body, a shield, a support fixed to the said shield and having a tubular portion telescoped with, and slidable along, the said rod, a spring member fixed to the said rod frictionally engaging opposite sides of the support member for resisting movement of the shield support member along the said rod and for keying the support member to the said rod to prevent rotation of the shield about the said rod.

3. A glareshield for an automotive vehicle body comprising a round rod having one end adapted for securement to the vehicle body, a shield, a support fixed to the said shield and having a tubular portion telescoped with, and slidable along, the said rod, an undulating wire spring member fixed to the said rod and frictionally engaging opposite sides of the tubular support member for resisting movement of the shield support member along the said rod and for keying the support member to the said rod to prevent rotation of the shield about the said rod.

4. A glareshield for an automotive vehicle body comprising a round rod having one end adapted for securement to the vehicle body, a shield, a support fixed to the said shield and having a tubular portion telescoped with the said rod and slidable along the said rod, an undulating wire spring having its ends mounted in openings in the said rod and frictionally engaging opposite sides of the tubular support member to resist movement of the shield support member along the said rod and for keying the support member to the said rod to prevent rotation of the shield about the said rod.

5. A glareshield for an automotive vehicle body comprising a round rod having one end adapted for securement to the vehicle body, a shield, a support fixed to the said shield and having a tubular portion telescoped with, and slidable along, the said rod, an undulating wire spring member fixed to the said rod and frictionally engaging opposite sides of the tubular support member for resisting movement of the shield support member along the said rod and for keying the support member to the said rod to prevent rotation of the shield about the said rod, and a stop mounted within the side walls of the tubular support member and between the undulating wire spring member and the end of the rod secured to the body, the said stop adapted to abut the said spring to limit outward adjustment of the shield along the said rod and to lock the said tubular support on the said rod.

6. A glareshield for an automotive vehicle body comprising a support bracket adapted for securement to the vehicle body, a round rod having one end journaled in the said bracket, a shield, a support fixed to the said shield and having a tubular portion telescoped with, and slidable along, the said rod, an undulating wire spring member fixed to the said rod and frictionally engaging opposite sides of the tubular support member for resisting movement of the shield support member along the said rod and for keying the support member to the said rod to prevent rotation of the shield about the said rod, and a stop mounted within the side walls of the tubular support member and between the undulating wire spring and the end of the rod secured to the body, the said stop adapted to abut the said spring to limit outward adjustment of the shield along the said rod and to lock the said tubular support on the said rod.

7. A glareshield for an automotive vehicle body, a support rod one end of which is adapted to be secured to the vehicle body, a shield, a support member having a tubular portion telescopically mounted on the said rod and opposed side wall portions overlapping the shield along one edge and fixed thereto, the tubular portion of the support member being slidable along the said rod, a resilient key member fixed to the said rod and frictionally engaging the opposed side wall members of the shield support member whereby the resilient member frictionally resists adjustment of the shield along the said rod and prevents relative rotation between the shield and the said rod.

8. A glareshield for an automotive vehicle body, a support rod one end of which is adapted to be secured to the vehicle body, a shield, a support member having a tubular portion telescopically mounted on the said rod and opposed side wall portions overlapping the shield along one edge and fixed thereto, the tubular portion of the support member being slidable along the said rod, a resilient key member fixed to the said rod and frictionally engaging the opposed side wall members of the shield support member whereby the resilient member frictionally resists adjustment of the shield along the said rod and prevents relative rotation between the shield and the said rod, and a stop mounted between the opposed side walls of the shield support member and adapted to abut the said resilient key member to limit the outward adjustment of the shield along the said rod and to maintain the rod and tubular support in telescopic engagement.

9. A glareshield for an automotive vehicle body comprising a support bracket adapted for securement to the body, a rod having one end journaled in the bracket for rotation about the longitudinal axis of the said rod, the said rod and bracket forming a friction hinge, a shield, a support member having a tubular portion telescopically mounted on the said rod and opposed side wall portions overlapping the shield along one edge and fixed thereto, the tubular portion of the support member being slidable along the said rod, an undulated wire spring fixed to the said rod and frictionally and yieldably engaging the opposed side wall members of the shield support member whereby the resilient member frictionally resists adjustment of the shield along the said rod and prevents relative rotation between the shield and the said rod.

LLOYD R. RHEIN.